Patented Apr. 28, 1931

1,803,140

UNITED STATES PATENT OFFICE

KARL T. STEIK AND HAROLD A. CASSAR, OF ELIZABETH, NEW JERSEY, ASSIGNORS TO STANDARD OIL DEVELOPMENT COMPANY, A CORPORATION OF DELAWARE

PROCESS FOR TREATING MINERAL OILS

No Drawing.   Application filed August 24, 1927.   Serial No. 215,266.

The present invention relates to the purification of hydrocarbon oils and more specifically comprises an improved process for manufacturing colorless or white oils. Our invention will be fully understood from the following description.

In the manufacture of colorless or water white oils, it is customary to subject a partially refined distillate from crude oil to succesive treatments with fuming sulfuric acid. Sludge formed by each of such treats is settled and withdrawn and the oil again treated with fuming acid. This process is repeated several times, then the oil is neutralized, washed with water and alcohol. Traces of alcohol are removed by distillation with steam and the treated oil is blown dry with warm or hot air. The oil is finally purified by percolation through a bed of fuller's earth or contact with such clays or other absorption agents.

We have discovered that oil refined in the manner described is sometimes unstable in respect to color, particularly on long exposure to sunlight or artificially produced actinic rays. We have further discovered that such oil may be made practically stable in respect to color and otherwise improved in odor and taste by a treatment comprising agitation for one hour or more with hot or warm weak sulfuric acid after the steps of fuming acid treatment, of neutralization and of washing, but before final purification with clay.

Weak acid treatment may be carried out in any suitable form of agitator such as is well known in the petroleum industry, but preferably fitted with a heating and cooling means. Fuming acid treatment is preferably at room temperature or below, while weak acid treatment is preferably between 70° C. and 120° C. Temperature during the weak acid treatment is adjusted in relation to the acid concentration, which is preferably below 90%, so that substantially no oxidation or sulfonation takes place. It is preferable to remove traces of alcohol before the weak acid treatment.

As an illustration of our process, a hydrocarbon oil distillate having a gravity of 23° A. P. I. and a Saybolt viscosity of 370 seconds at 100° F. is subjected to five successive treatments with 5% by volume of fuming sulfuric acid containing 20% of free $SO_3$. The temperature was approximately 20° C. during the agitation and after each treat the lower or sludge layer is withdrawn. After the five fuming acid treatments, the oil is neutralized with caustic soda and washed with water and alcohol, 50% isopropyl alcohol. The oil is then given two additional treats with 5% of fuming acid, as above, and again neutralized and washed with water and alcohol. Traces of alcohol are removed by distillation with steam. The oil is now agitated for about 2 hours with 5% by volume of 88% sulfuric acid and temperature is maintained at about 75° C. Sludge is allowed to settle and is removed. The oil is neutralized with soda, followed by a water wash and blown dry with warm air. The oil now has a gravity of approximately 27° A. P. I., Saybolt viscosity of 250 seconds at 100° F. and color of 25 Saybolt. Percolation through fuller's earth raises color to 30+ Saybolt or better and the oil is finished.

Our invention is applicable to all mineral oils which are purified to the degree that they may be termed white, colorless or water white. Our process is not to be limited by any theory of the mechanism of the process nor by any example given merely by way of illustration, but only by the following claims, in which we wish to claim all novelty inherent in our invention.

We claim:

1. In the process of manufacturing colorless or white oil, the steps of agitating a distillate of mineral oil, after treatment with fuming sulfuric acid, with hot sulfuric acid of concentration not more than 90% and at a temperature at least as high as 70° C. and finally treating with a solid adsorption agent.

2. In the process of manufacturing colorless or water white oil, the step of agitating a distillate of crude oil for at least one hour with sulfuric acid of concentration not more than 90% and at a temperature at least as high as 70° C. after treatment with fuming acid and before treatment with active clay.

3. In the process of manufacturing colorless or water white oil, the step of treating a distillate of crude oil for at least one hour with sulphuric acid of concentration not more than 90% and at a temperature between 70 and 120° C. after treatment with fuming sulphuric acid and before treatment with active clay.

4. The method of manufacturing colorless or white oil which comprises treating a distillate of mineral oil with fuming sulphuric acid, treating the oil with not more than 5% by volume of sulphuric acid of not more than 90% of concentration at a temperature at least as high as 70° C., and subsequently treating the oil with an adsorption agent.

KARL T. STEIK.
HAROLD A. CASSAR.